Nov. 6, 1962 R. WONG 3,062,677
METALLIZED GLASS FIBERS AND METHOD
Filed Dec. 31, 1956
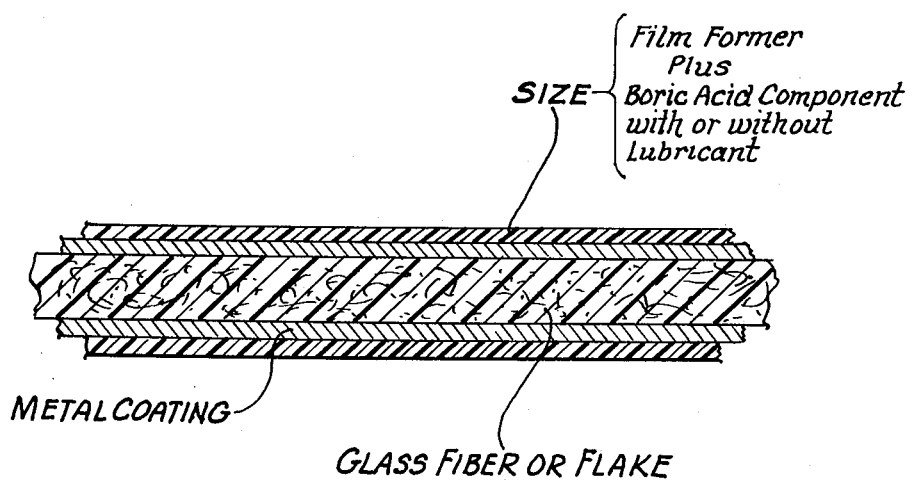
INVENTOR.
Robert Wong
BY
Staelin and Overman
Attorneys

United States Patent Office 3,062,677
Patented Nov. 6, 1962

3,062,677
METALLIZED GLASS FIBERS AND METHOD
Robert Wong, Granville, Ohio, assignor to Owens-Corning Fiberglas Corporation, a corporation of Delaware
Filed Dec. 31, 1956, Ser. No. 631,440
10 Claims. (Cl. 117—71)

This invention relates to glass fibers and flakes having a thin coating of a metal thereon, and it relates more particularly to a size composition applied to such metallized fibers and flakes for protecting the metal coating while improving the processing and performance characteristics of the glass elements.

In the fabrication of metal-coated fibers and flakes, a thin layer of a metal is provided on the surfaces of the glass fibers or flakes by various commercial techniques which have heretofore been developed. For such purposes, coatings have been made of such materials as copper, tin, lead, zinc and the like and alloys thereof. These metallized fibers and flakes have found many useful applications. For example, metallized fibers are capable of excellent use as a substitute for tire cords in the manufacture of improved reinforced rubber tires, and they have been used in other applications wherein the high strength properties of the glass fibers are desirable and where the metal coating has utility to prevent deterioration of the glass fibers by abrasion and the like.

From the standpoint of performance characteristics, it has been found that the thin layer of metal on the glass fiber surfaces tends to oxidize very rapidly, especially when brought into communication with alkaline substances. As a result, the desired processing characteristics of the glass fibers in the formation of strands, yarns and fabrics is greatly depreciated and the oxidized metal on the surfaces of the glass fibers not only detracts from the appearance of the fibers but the oxides tend markedly to reduce the flexure life and flexure strength of the fibers.

Thus it is an object of this invention to produce and to provide a method for producing metal-coated glass fibers and flakes in which the oxidation of the metal component is minimized and which embodies improved processing and performance characteristics, and it is a related object to provide a composition for use in such treatment of metallized glass fibers and flakes.

More specifically, it is an object of this invention to treat metallized glass fibers and flakes with a size composition which not only provides a desired balance between lubricity and bonding for processing the glass fibers in the fabrication of strands, yarns, cords and textile materials but which also minimizes the oxidation of the metal coating on the surfaces of the glass elements to improve the processing and performance characteristics thereof.

These and other objects and advantages of this invention will hereinafter appear and for purposes of illustration, but not of limitation, an embodiment of the invention is shown in the accompanying drawing in which the single FIGURE is an enlarged sectional elevational view through a coated fiber embodying the features of this invention.

These and other objects and advantages of this invention have been achieved by the treatment of the metallized glass fibers and flakes with a size composition formulated to contain a film-forming synthetic resinous material in a combination which includes boric acid or an equivalent thereof.

The film-forming resinous material in the size composition operates to protect the glass fibers and to provide a desired amount of bonding for holding the fibers together in the bundle or strand for twisting or intertwisting in the preparation of yarns and cords and for the use thereof in weaving fabrics or for use in the formation of cords or other elements as a reinforcement. The boric acid component appears to function in the system to protect the metal coating on the surfaces of the glass fibers or flakes as by the neutralization of the alkali to reduce the rate of oxidation and/or by reaction with the metal to form the corresponding metal borate at the interface to protect the metal-coated fibers or flakes from any further attack.

It is desirable in a system of the type described to make use of elements in the size composition which are incapable of reacting with the boric acid so that the film former and lubricant (when used) will be available to provide the desired balance between lubricity and bonding and so that the boric acid will remain available in the system to impart its described functions. As the film-forming resinous component, use has been made of butadiene acrylonitrile copolymer, butadiene-styrene copolymer, polystyrene, polyacrylate or polyalkyl acrylate, polyvinyl acetate, vinyl acetate-vinyl chloride copolymer, polyvinylidene, polyacrylamide, polytetrafluoroethylene and the like polymers and copolymers. In a size composition, these film-forming resinous materials can be used in concentrations ranging from 0.5 to 10 percent by weight but it is preferred to make use of the resinous component in an amount within the range of 1 to 5 percent by weight.

The boric acid concentration in the size composition can range from 0.1 percent by weight to the maximum capable of solution in the aqueous size composition. For example, about 5 percent by weight boric acid can be taken into solution in an aqueous system at about 20° C. It is preferred to make use of an amount of boric acid which is in the upper portion of the range such, for example, as in an amount within the range of 2–5 percent by weight of the size composition.

By way of modification to provide the desired balance between lubricity and bonding in the treating composition, use can be made of small amounts of conventional glass fiber lubricants as represented by organosilicon fluids (polysiloxanes), fatty acid amides, pelargonate amides solubilized with acetic acid, tetraethylenepentamine, stearic acid condensation product solubilized with acetic acid, tetraethylenepentamine reacted to contain 5 methalyl side chains attached directly to the nitrogen group, and the like glass fiber lubricants such as are described in the Williams and Bone Patents No. 2,083,132 and No. 2,107,284. When employed, the amount of lubricant can range from 0.1 to 2.0 percent by weight of the treating composition.

Use can also be made, in the size composition, of water-soluble colloids as a bodying agent in the size composition. In addition to increasing the body or viscosity of the treating composition, such water-soluble colloids benefit the abrasion resistance of the metallized glass fibers and flakes. As the water-soluble colloid, the following are representative of water-soluble colloids which may be employed in the size composition in amounts up to 5 percent by weight: cellulose gum, gum tragacanth, kayar gum, hydroxyethyl cellulose, methyl cellulose, algenates, pectins, gelatin and the like.

The following will provide representative formulations for use in preparing size compositions in the treatment of metallized glass fibers and flakes.

Example I

| Composition | Percent by weight |
|---|---|
| Cationic butadiene-acrylonitrile copolymer (Hycar 1502X419), a mixture of cationic butadieneacrylonitrile copolymers containing a cationic emulsifying agent supplied by B. F. Goodrich | 1.9 |
| Boric acid | 2.4 |
| Distilled water | 95.7 |
| Drops of an antifoaming agent (Dow Corning Antifoam A) | 1-5 |

Example II

| Composition | Percent by weight |
|---|---|
| Polyvinyl chloride latex | 3.0 |
| Boric acid | 2.4 |
| Water | 94.6 |

Example III

| Composition | Percent by weight |
|---|---|
| Polyalkyl acrylate (Rhoplex FRN emulsion) | 5.0 |
| Boric acid | 2.3 |
| Water | 92.7 |
| Pelargonate stearate lubricant (Ahco 185A, Arnold Hoffman & Co.) | 0.2 |

Example IV

| Composition | Percent by weight |
|---|---|
| Cationic butadiene-acrylonitrile copolymer (Hycar 1502X419) | 1.9 |
| Boric acid | 2.4 |
| Organosilicon fluid (Silicon Oil X-525, Linde Air Products Co.) | 1.0 |
| Water | 94.7 |

Example V

| Composition | Percent by weight |
|---|---|
| Polyvinyl acetate emulsion | 1.9 |
| Boric acid | 2.4 |
| Water | 95.7 |

Example VI

| Composition | Percent by weight |
|---|---|
| Polyacrylamide 100 polymer of acrylamide having an average molecular weight of 100 (American Cyanamid Co.) | 1-4 |
| Cellulose gum sodium carboxy methyl cellulose (Hercules Powder Co.) | 2.0 |
| Gelatin | 1.0 |
| Boric acid | 2.0 |
| Water | 93-94 |
| Drops antifoaming agent | 1-5 |

These materials can be combined in any desired order. An emulsion is formed by the admixture of materials which can be applied as a thin film to the metallized glass fibers or flakes as by conventional size applications using a wiper pad, roller applicator, flow coating, spray coating, or a dipping process. It will be sufficient if a monomolecular coating is applied to the metallized surfaces. Usually application will be made prior to gathering a multiplicity of the fibers together to form a strand or yarn, but application can be made as they are brought together or after they have been brought together. Air drying will be sufficient although drying of the size on the surfaces of the glass elements can be accelerated by hot air.

When sized in the manner described, the improved processing and performance characteristics of the glass fibers will be retained indefinitely and the metallized glass fibers or flakes will retain their metallic luster as distinguished from the whitened appearance acquired by the metallized glass elements in the absence of such treatment. Zinc-coated glass fibers treated in the manner described, as by Examples I to VI, have been found to out-perform rayon in flexure by 200-300 percent. Metallized fibers treated in the manner described can be twisted and intertwisted with ease and without deterioration of any of the desirable properties thereof.

It will be understood that changes may be made in the details of formulation, preparation and application onto the metallized glass fibers or flakes without departing from the spirit of the invention, especially as defined in the following claims.

I claim:

1. A metallized glass element in the form of a glass fiber or flake, comprising the glass element, a metal coating on the surfaces of the glass element, and a size coating on the metallized glass element comprising the mixture of a thermoplastic film-forming polymeric material and boric acid present in the ratio of 0.5 to 10 parts by weight of the film-forming material to 0.1 to 5 parts by weight of boric acid.

2. Metallized glass fibers, comprising glass fibers, a thin metal coating about the surfaces of the glass fibers, and a size coating on the metallized glass fibers comprising the combination in admixture of a thermoplastic film-forming resinous material and boric acid present in the ratio of 0.5 to 10 parts by weight of the film-forming material to 0.1 to 5 parts by weight of the boric acid.

3. A metallized glass element in the form of a fiber or flake, comprising the glass element, a thin metal coating on the surfaces of the glass element, a size coating on the metallized glass element comprising the combination in admixture of a thermoplastic film-forming polymeric material and boric acid present in the ratio of 0.5 to 10 parts by weight of the film-forming material to 0.1 to 5 parts by weight of the boric acid, and a metal borate at the interface between the metal coating and the size coating.

4. A metallized glass element in the form of a fiber or flake, comprising the glass element, a thin metal coating on the surfaces of the glass element, and a size coating on the metallized glass element comprising the combination in admixture of a thermoplastic film-forming polymeric material, boric acid, and a glass fiber lubricant present in the ratio of 0.5 to 10 parts by weight of the film-forming material, 0.1 to 5 parts by weight of the boric acid, and 0.1 to 2.0 parts by weight of the lubricant.

5. A metallized glass element in the form of a fiber or flake, comprising the glass element, a thin metal coating on the surfaces of the glass element, and a size coating on the metallized glass element comprising the combination in admixture of a thermoplastic film-forming organic polymeric material, boric acid, and a water-soluble colloid in which the materials are present in the ratio of .5 to 10 parts by weight of the film-forming material, 0.1 to 5 parts by weight of boric acid, and up to 5 parts by weight of the water-soluble colloid.

6. A metallized glass fiber comprising a glass fiber, a thin metal coating on the surfaces of the glass fiber, and a size coating on the metallized glass fiber comprising the combination in admixture of a thermoplastic film-forming organic polymeric material, boric acid, a glass fiber lubricant, and a water-soluble colloid in which the materials are present in the ratio of .5 to 10 parts by weight of the film-forming material, 0.1 to 5 parts by weight boric acid, 0.2 to 2.0 parts by weight of the glass fiber lubricant, and up to 5 percent by weight of the water-soluble colloid.

7. A size composition for application to metallized glass fibers consisting of water as the carrier, .5 to 10 percent by weight of a thermoplastic film-forming resinous material as a dispersed phase and boric acid in an amount ranging from 0.1 to the amount capable of saturating the aqueous system.

8. A size composition for treatment of metallized glass fibers consisting of water as the carrier, a thermoplastic film-forming resinous material, boric acid, and a glass fiber lubricant in which the materials are present in amounts ranging from .5 to 10 percent by weight of the film-forming material as a dispersed phase, 0.1 to 5.0 percent by weight of boric acid, and 0.2 to 2.0 percent by weight of the glass fiber lubricant.

9. A size composition for the treatment of a metallized glass fiber consisting of water as the carrier, .5 to 10 percent by weight of a thermoplastic film-forming resinous material as a dispersed phase, 0.1 up to an amount capable of saturating the aqueous system of boric acid, and up to 5 percent by weight of a water-soluble colloid.

10. A size composition for treatment of a metallized glass fiber consisting of water as the carrier, .5 to 10 percent by weight of a thermoplastic film-forming resinous material as a dispersed phase, 0.1 to 5 percent by weight boric acid, 0.2 to 2.0 percent by weight of a glass fiber lubricant, and up to 5 percent by weight of a water-soluble colloid.

References Cited in the file of this patent

UNITED STATES PATENTS

| | | |
|---|---|---|
| 2,607,765 | Czerwin et al. | Aug. 19, 1952 |
| 2,664,409 | Aickin et al. | Dec. 29, 1953 |
| 2,684,953 | Stilbert et al. | July 27, 1954 |
| 2,699,415 | Nachtman | Jan. 11, 1955 |
| 2,809,949 | Orth | Oct. 15, 1957 |
| 2,829,067 | Eastland | Apr. 1, 1958 |
| 2,920,981 | Whitehurst | Jan. 12, 1960 |
| 2,935,471 | Aarons et al. | May 3, 1960 |

FOREIGN PATENTS

| | | |
|---|---|---|
| 721,879 | Great Britain | Jan. 12, 1955 |